Aug. 27, 1957  E. W. MacKNIGHT  2,803,990
OPTICAL PERIMETER
Filed Aug. 1, 1951  4 Sheets-Sheet 1
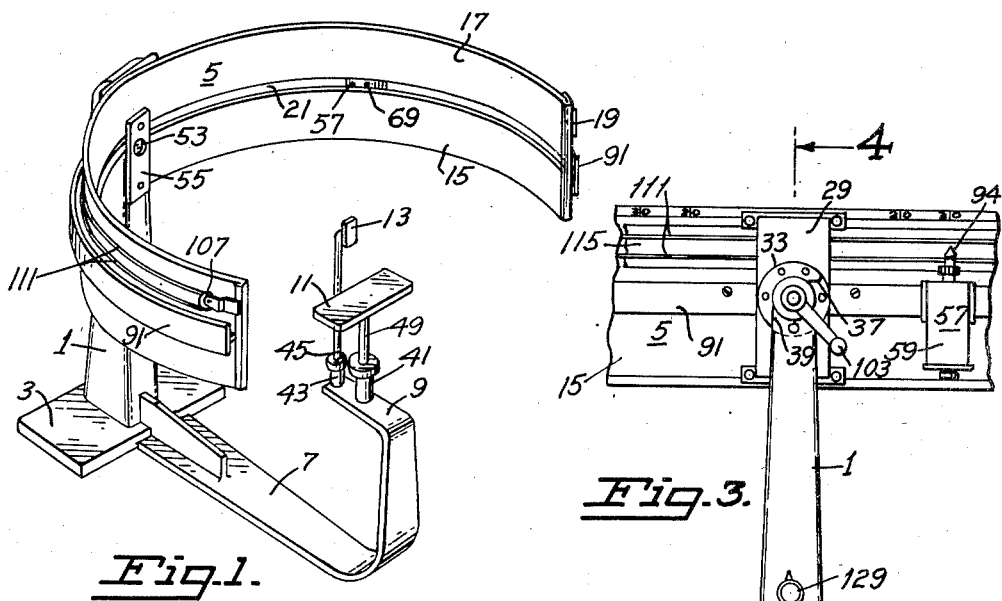
Fig.1.
Fig.3.
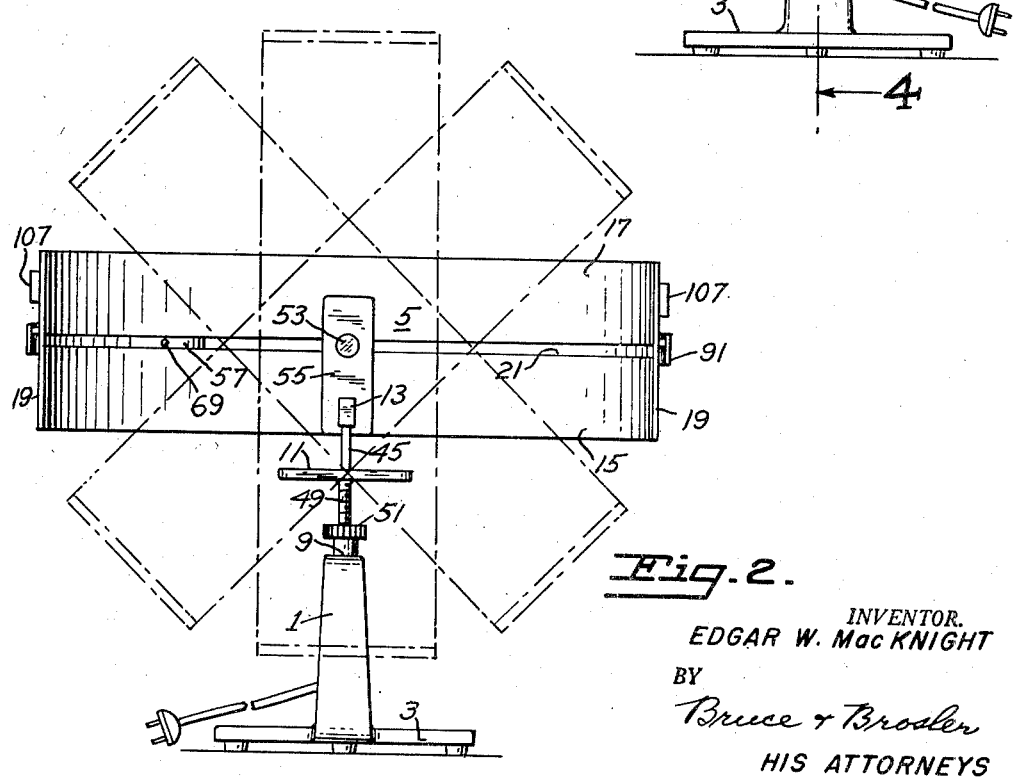
Fig.2.
INVENTOR.
EDGAR W. MacKNIGHT
BY
Bruce + Brosler
HIS ATTORNEYS Aug. 27, 1957  E. W. MacKNIGHT  2,803,990
OPTICAL PERIMETER
Filed Aug. 1, 1951  4 Sheets-Sheet 2

INVENTOR.
EDGAR W. MacKNIGHT
BY
Bruce & Brosler
HIS ATTORNEYS

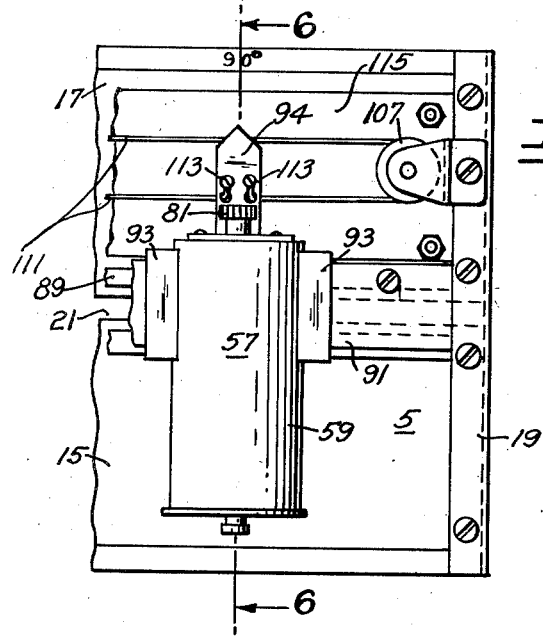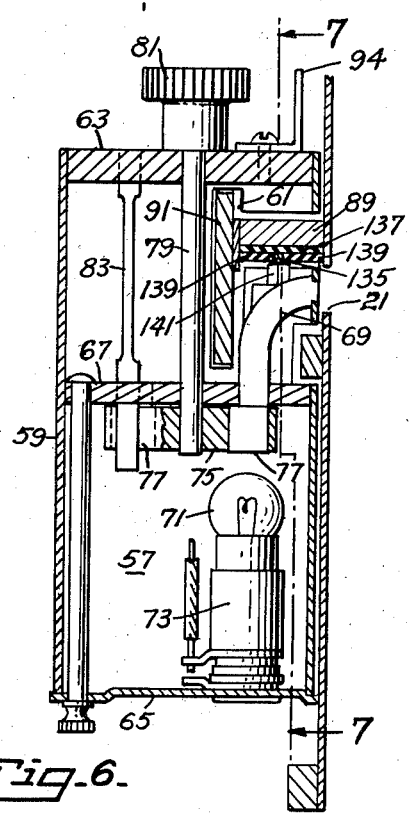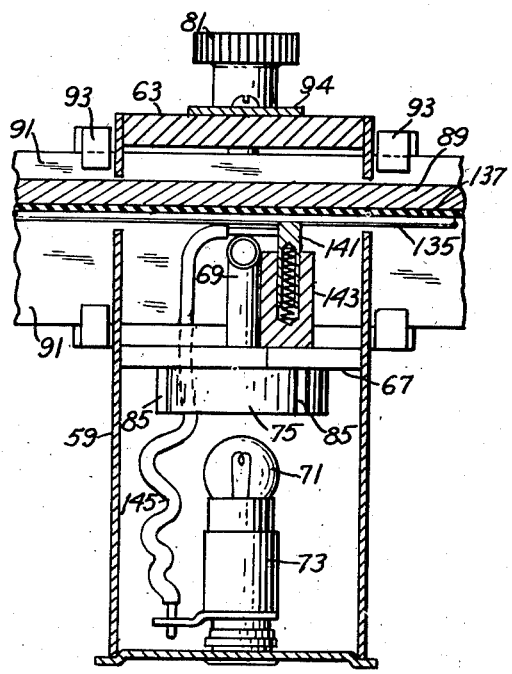

Aug. 27, 1957

E. W. MacKNIGHT 2,803,990

OPTICAL PERIMETER

Filed Aug. 1, 1951

INVENTOR.
EDGAR W. MacKNIGHT
BY
Bruce & Brosler
ATTORNEYS

United States Patent Office 2,803,990
Patented Aug. 27, 1957

2,803,990

OPTICAL PERIMETER

Edgar W. MacKnight, San Leandro, Calif., assignor, by decree of distribution, to Bonna MacKnight Application August 1, 1951, Serial No. 239,691

6 Claims. (Cl. 88—20)

My invention relates to optical perimeters, and more particularly to the target assembly, its operation and relationship to the arc.

Optical perimeters are instruments for making visual field studies of an individual's eyes, and, in use, involve the movement of a target on an arc adjustable to various planes, while the eye of a patient remains disposed at the center of curvature of the arc and directed steadily at a point on the center axis of rotation of the arc.

In prior art devices of this character, various factors rendered it difficult to realize uniformly accurate results, making it necessary for an operator to check and double check his results to assure reasonable accuracy. This is attributable largely to the fact that the average patient possesses a natural tendency to create a good record, and consciously or unconsciously will gauge the position of the target by some visual indication other than the target and report the same within his field of vision, though the target itself may have moved out of sight. Thus, where the operator manually shifts the target along the arc, a portion of his hand is likely to remain within the angular field of vision of the patient's eye, though the target itself may be outside such field, and the patient is apt to report a false indication to the operator. Likewise, if the target mounting, itself, presents an angular spread along the arc, its bounding edge might also indicate the location of the target, and the patient, if guided by this, will naturally cause the operator to record false results.

A further factor conducive to inaccuracy of results, lies in the use of indirect lighting and rendering the target visible by reflected light or, in other words, light reflected from the target to the patient's eye. The entire arc must, under such circumstances, be uniformly illuminated, and the sharpness of the target will necessarily depend, therefore, on the difference in light intensity reflected from the target and the surrounding area.

Among the objects of my invention are:

(1) To provide a novel and improved optical perimeter;

(2) To provide a novel and improved optical perimeter which shall offer no opportunity for a patient to determine the location of the target, other than by the target itself;

(3) To provide a novel and improved optical perimeter in which the target is the only visible moving element within the field of vision of a patient;

(4) To provide a novel and improved optical perimeter in which the target is rendered visible by concentrated and direct lighting;

(5) To provide a novel and improved optical perimeter in which the operational movements of an operator are localized and concealed behind the arc and thus performed out of sight of the patient;

(6) To provide a novel and improved optical perimeter of rugged construction, yet characterized by ease of operation;

(7) To provide a novel and improved optical perimeter which will enable an operator to make visual field surveys faster and more accurately.

Additional objects of my invention will be brought out in the following description of a preferred embodiment of the same taken in conjunction with the accompanying drawings wherein—

Figure 1 is a three-dimensional view of an optical perimeter embodying the features of the present invention, and showing the arc disposed in a horizontal plane;

Figure 2 is a front elevational view of the perimeter of Figure 1, and depicting in phantom the various planar adjustments of the arc;

Figure 3 is a fragmentary rear view in elevation of the perimeter of Figure 1;

Figure 5 is a rear elevational view of the target carrier and mounting;

Figure 6 is an elevational view in section taken in the plane 6—6 of Figure 5;

Figure 7 is an elevational view in section taken in the plane 7—7 of Figure 6;

Figure 4:
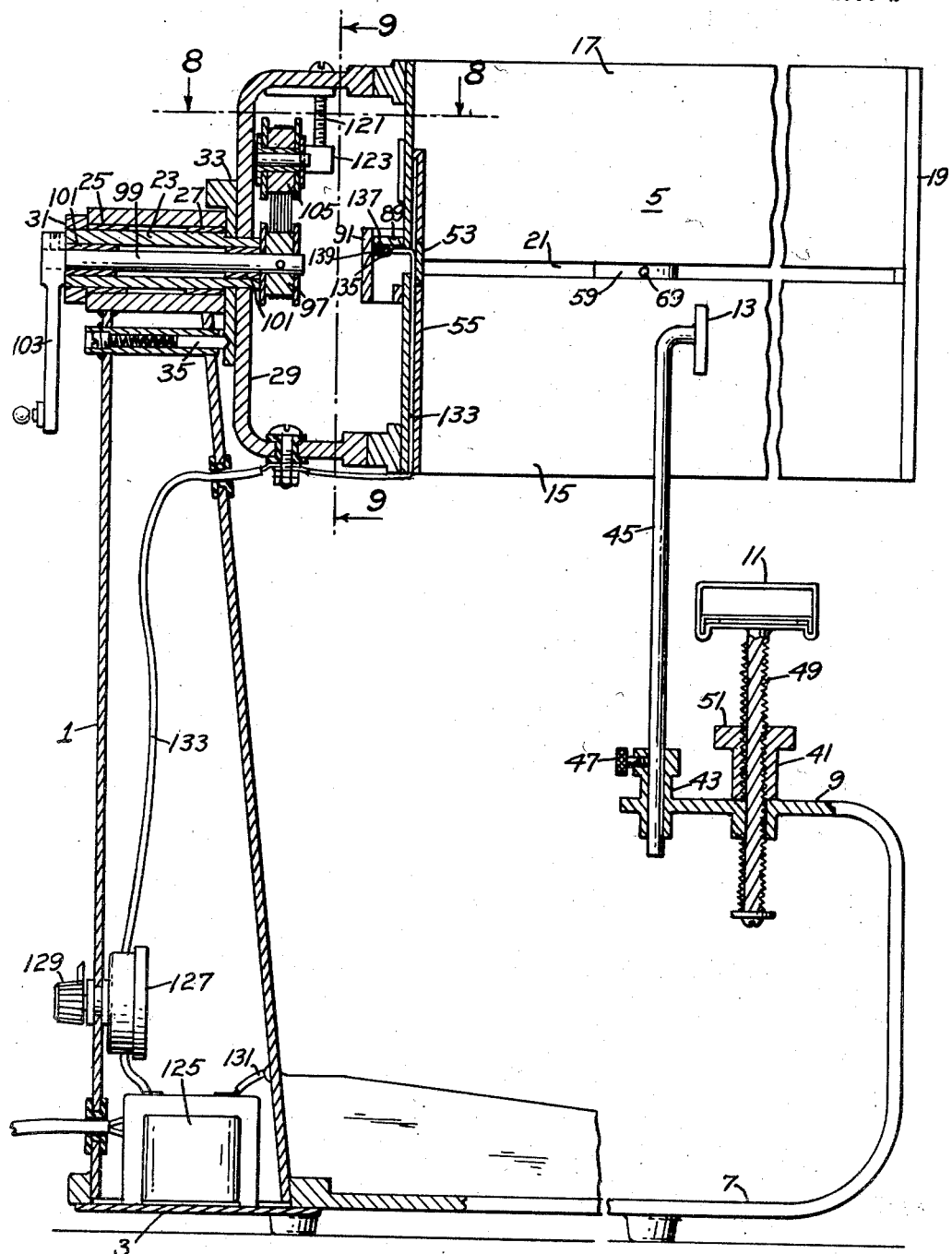
Figure 4 is an elevational view in section taken in the plane 4—4 of Figure 3.
Figure 9:
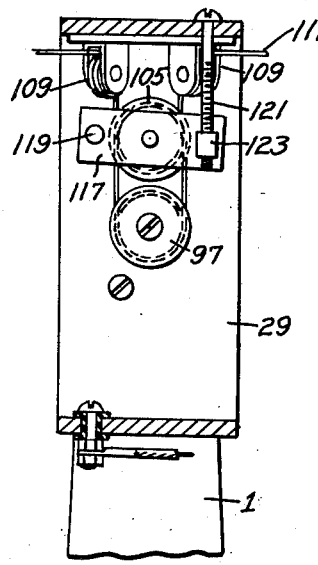
Figure 9 is a view taken in the plane 9—9 of Figure 4.
Figure 8:
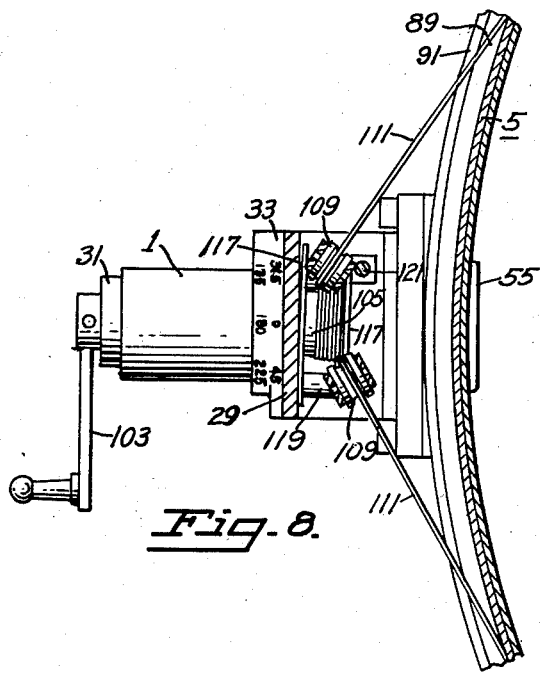
Figure 8 is a fragmentary view taken in the plane 8—8 of Figure 4.
Figure 10:
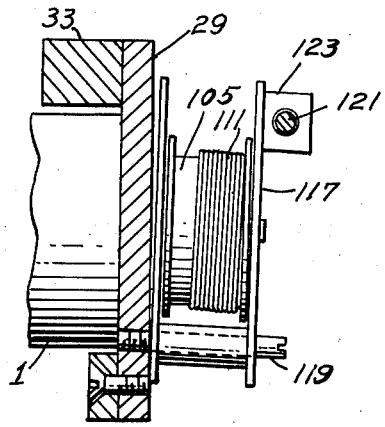
Figure 10 is an enlarged view of a detail of Figure 8.

Referring to the drawings for details of my invention in its preferred form, the same comprises a standard 1 mounted on a base 3, an arc 5 supported at the upper end of the standard, a frame 7 extending from the base and terminating in a narrow platform 9 for mounting a chin rest 11 and cheek stop 13 at approximately the center of curvature of the arc.

The arc is made up of a pair of arc sections 15, 17 held in lateral spaced relationship to each other by end connectors 19 to form a narrow slot 21 longitudinally of the arc. It is mounted on the standard for pivotal rotation thereon, and this is accomplished structurally by means of a sleeve 23 through the upper end of the standard and supported in bearings 27 for rotational movement therein, and a U-shaped bracket 29 affixed at its central point to said sleeve at one end thereof. At its free ends, the bracket is joined to the arc centrally thereof along its upper and lower edges. A stop collar 31 about the other end of the sleeve in abutting contact with the upper end of the standard, serves to restrain the sleeve against shifting. The arc is normally painted a dull black to inhibit light reflection therefrom.

Adjustability of the arc to various angular positions or planes of predetermined locations is controlled by an indexing arrangement involving an index ring 33 affixed to the back of the bracket concentric with the sleeve 23, and a spring pressed index pin 35 mounted in the standard in line with the index ring.

At the various predetermined angular positions of the arc, usually employed in making field studies, the index ring is provided with recesses to receive the index pin and thus stabilize the arc at such angular positions. The index ring may be calibrated with respect to some fixed point, such as a reference mark at the top of the standard for example, to indicate a prevailing angular position of the arc. Normally such indexing arrangement provides for stabilizing the arc at intervals of every forty-five degrees measured from the horizontal position of the arc, and on this basis, permissive rotational movement of the arc through an angle of 315 degrees, for example, counterclockwise from a minus 45 degree angle, will encompass all the desired positions of the arc; and accordingly to limit the rotational movement of the arc to such range, the index ring is formed with shoulders 37, 39, which are so located as to strike the standard when the arc has reached either one of its two limiting positions.

Both the chin rest and the cheek stop are adjustably mounted in the platform 9 of the frame. In each case a vertically disposed sleeve 41, 43 respectively, integrally united to the frame platform, serves as a mounting support in which the adjustable component is slidably received.

In the case of the cheek stop, it includes a stem 45 passing through its associated sleeve, and its elevational adjustment is fixed by a setscrew 47, while in the case of the chin rest, it is provided with a threaded shank 49 slidably receivable in its sleeve, but is precluded from turning therein by a tongue and groove connection. The elevational adjustment of the chin rest is fixed by a lock nut 51 on the threaded shank and adapted to be threaded into locking contact with the upper end of the supporting sleeve.

The location and adjustments of these two components are such as to bring the patient's eye on the rotational axis of the arc and at substantially the center of curvature thereof. Such axial position of the eye may readily be determined by means of a small mirror 53 carried in a plate 55 which is affixed to the face of the arc, with the center of the mirror coinciding with the axis of rotation of the arc. The correct position of the chin rest is determined when the patient sees the image of his eye centrally located in the mirror and the cheek stop is adjusted accordingly.

The target carrier 57 of the present invention is adapted to travel along the rear surface of the arc and comprises a cylindrical housing 59 having a target opening therein and rail slots 61 symmetrically disposed with respect to the target opening. The housing is closed at its upper end by a circular disk or plate 63 and at its lower end by a floor 65, and at an intermediate elevation, is divided into an upper chamber and lower chamber by a partition 67.

Anchored in a hole through the partition is a target 69 which takes the form of a section of Lucite rod extending upwardly from the partition but curved to terminate at one end in the target opening, while mounted on the floor of the carrier housing and in line with the Lucite rod, is a source of illumination in the form of a light bulb 71 mounted in a light socket 73. The color of the light reaching the Lucite rod target may be conveniently altered by a color wheel 75 embodying a number of lenses 77 of different colors.

This color wheel is mounted at the lower end of a rod 79 journaled in the upper end disk of the carrier housing and the partition, and carrying at its upper end, a knob 81 for manually rotating the color wheel to cause movement of the successive color lenses into the path of light from the light source to the target. A stabilizing spring 83 anchored at its upper end to the disk of the housing and passing downwardly through a slot in the partition, is adapted to bear or press against the periphery of the color wheel, which is provided with peripheral notches 85 at such points as to receive the stabilizing spring when a color lense intercepts the path of light from the source of illumination to the target.

As previously indicated, the target carrier is mounted for sliding movement along the rear surface of the arc from one end thereof to the other and this is accomplished by providing along the rear surface of the arc, track means on which the carrier is mounted for such sliding movement.

Such track means involves a mounting strip 89 affixed to the rear surface of the arc in parallel to and preferably just above the slot, and carrying on its outer edge, a rail 91 which is attached thereto as by the use of machine screws or the like. Such rail and mounting strip pass through the aforementioned rail slots of the target carrier, on the housing of which, are provided guide bearings 93 bounding the rail slots to carry the weight of the target carrier and provide for smooth travel of the same along the rail.

To accurately determine any position of the target on the arc, an upwardly directed indicating tab 94 is mounted on the closure disk 63, while along the rear surface of the upper edge of the arc, the arc is calibrated, preferably in terms of degrees, measured from the center of the arc.

Movement of the target carrier along the rail is controlled entirely from a single point behind the arc, such operation being completely blocked from a patient's view by the arc itself. The mechanism for accomplishing such movement involves a pulley drive system including a capstan pulley 97 affixed to one end of a shaft 99 which passes through the arc-mounting sleeve and is supported on bearings 101 therein. To the other end of this shaft is mounted a crank 103 whereby to manually rotate the capstan pulley.

Spaced somewhat from the capstan pulley and mounted on the arc-supporting bracket, is an idler pulley 105, while at each end of the arc, the pulley system includes an end pulley 107, and suspended from the upper part of the arc-mounting bracket intermediate the idler tension pulley and each end pulley is a guide sheave 109.

The target carrier is connected in the pulley drive system by a drive cable or line 111, which forms a closed loop, with each end of the loop terminating at the indicating tab 94 to which it is anchored by a screw 113. The cable is installed by connecting one end to the indicator tab, threading it through an end pulley and over an intermediate guide pulley, following which it is wrapped a number of times around the capstan and idler tension pulley assembly. The cable is then threaded through the other guide sheave to the remaining end pulley and back to the indicator tab on the target carrier at which point it is anchored. Turning of the crank will accordingly cause the target carrier to slide along the rail in a direction depending upon the direction of rotation of the crank by the operator.

By reason of the curvature of the arc, the pulley line will necessarily slide in contact with the rear surface of the arc during movement of the target carrier, and to protect the painted surface of the arc from wear due to such contact, I prefer to apply to the rear surface of the arc, covered by the drive cable, a wear strip 115 of bare metal. This strip is preferably chrome-plated to give it an exceptionally hard surface, while the pulley cable itself is preferably of bronze to minimize the coefficient of friction between the cable and the wear plate, and thus not only reduce wear, but also permit adjustments of the target carrier with smoothness and a minimum of effort.

The wear and the effort necessary to make adjustments can both be further materially reduced by maintaining a relatively slack line along the arc, and this I have found can be accomplished by maintaining tension in the turns of the cable about the capstan and idler pulley assembly.

To assure the existence of such tension, means is provided for adjusting the spacing between the idler pulley and the capstan pulley, and such adjusting means may include a cradle frame 117 in which the idler pulley is mounted, such cradle frame being pivotally mounted at one end on a pivot rod 119 which passes therethrough and is anchored in the arc-mounting bracket. The other end of the cradle frame is supported by an adjusting screw 121 passing through the upper end of the arc-mounting bracket and threadedly engaging a block 123 affixed to such end of the frame. By adjusting such screw, it will be apparent that the tension in the cable strands passing between the capstan and idler pulleys, may be varied to satisfy the required conditions.

A factor of substantial importance in connection with the smooth and efficient operation of the pulley system involves the provision of means for preventing the various strands of cable from overlapping one another as the pulley system is put into operation, because I have found that unless such strands maintain their respective positions on the capstan and idler pulleys at all times, the system will not function satisfactorily. To accomplish this end, the cradle frame, and, consequently, the idler pulley, are supported at a slight angle with respect to the capstan pulley, and this may be realized through the very simple expedient of installing the pivot rod 119 at a slight angle to the normal.

To render the operation of the instrument safe from the electrical standpoint, the source of illumination is of the low voltage type, for example, a six volt lamp, operating off the secondary of a transformer 125 housed in the lower end of the standard. The degree of illumination may be controlled by a rheostat 127 also housed in the standard but provided with an exposed knob 129 at the rear thereof to permit an operator to manually exercise such control.

To obtain and maintain continuity of circuit to the source of illumination, one side 131 of the secondary of the transformer is grounded to the frame or casing, while the other side of the secondary is connected by suitable wiring 133 to a continuous contact in the form of a length of heavy gauge, bare wire 135 running along the underside of the rail mounting strip 89 and insulated therefrom by a thin strip 137 of insulation. The contact wire is stabilized centrally of the mounting strip by bordering strips 139 of insulation. The lighting circuit from this contact wire to the source of illumination, is completed through a brush 141 resiliently mounted in a block 143 of insulation such as Lucite, which is carried by the partition in the carrier housing. A wire 145 connects this brush to the appropriate contact in the lamp base 73.

From the foregoing description of my invention in its preferred form, it will be apparent that the target may be shifted from one end of the arc to the other, while the controlling movements of the operator are confined to a small region centrally of the arc and blocked from view of the patient by the arc itself. The target is directly illuminated from behind the arc and this not only eliminates the necessity of illumination against the front surface of the arc itself, but the absence of such frontal illumination permits of sharper contrast between the target and the surrounding area. Changes in the color presented by the target may also be effected out of sight of the patient, thus eliminating the possibility of such operation giving some clue to the patient as to the approximate whereabouts of the target, should such target at the moment be out of sight or beyond the range of vision of the patient.

In utilizing the instrument for its intended purpose, the chin rest and cheek stop are adjusted so as to bring the patient's eye in line with the mirror, and with the patient so disposed, the operator makes such adjustments of the target carrier and the target as are necessary to conduct the surveys or tests under consideration. During such manipulations the only moving object presented to the patient is the target itself, and, therefore, all his responses must be based directly on his ability or inability to see the target, and not upon the location of the target as deduced from his ability to see movements of the operator or other motions of the equipment tied in with the movement of the target.

In this connection, it is important to note that the cylindrical contour of the target carrier housing is significant, in that, when viewed through the slot by the patient, the surface naturally fades into the background and presents no sharp distinguishing edges which might give the patient some clue as to the whereabouts of the target itself, as the target passes from his field of vision.

From the above description of my invention in its preferred form, it will be apparent that the same fulfills all the objects attributable thereto, and while I have described the same in considerable detail, I do not desire to be limited in my protection to the specific details as illustrated and described, except as may be necessitated by the appended claims.

I claim:

1. An optical perimeter comprising a standard; an arc; means for mounting said arc on said standard for pivotal rotation thereon, said means including a sleeve through the upper end of said standard supported in bearing means for rotational movement in said standard, and a bracket affixed to one end of said sleeve and supporting said arc; a target carrier; a target carried by said carrier; means slidably mounting said carrier for movement along said arc; means for sliding said target carrier along said carrier-mounting means, said means comprising a pulley system including a capstan pulley mounted on a shaft through said bracket and rotatable by a crank affixed to the other end thereof, an idler tension pulley mounted on said bracket, a pulley mounted at each end and to the rear of said arc, a drive cable having one end connected to said target carrier, said cable passing under light tension through an end pulley, around said idler and capstan pulleys a number of turns, then through the remaining end pulley and back to the target carrier; and means for adjusting the spacing between said idler pulley and said capstan pulley to increase the tension in the turns of cable encircling said pulleys, whereby those portions of cable extending along the arc might remain relatively slack without impairing the effectiveness of said pulley system.

2. An optical perimeter comprising a standard; an arc; means for mounting said arc on said standard for pivotal rotation thereon, said means including a sleeve through the upper end of said standard supported in bearing means for rotational movement in said standard, and a bracket affixed to one end of said sleeve and supporting said arc; a target carrier; a target carried by said carrier; means slidably mounting said carrier for movement along said arc; means for sliding said target carrier along said carrier-mounting means, said means comprising a pulley system including a capstan pulley affixed to one end of a shaft, bearing-mounted in said sleeve and rotatable by a crank affixed to the other end thereof, an idler tension pulley, a pulley mounted at each end and to the rear side of said arc, a drive cable having one end connected to said target carrier, said cable passing through an end pulley, around said idler and capstan pulleys a number of turns, then through the remaining end pulley and back to the target carrier; and means adjustably supporting said idler pulley in said bracket in adjustable spaced relationship to said capstan pulley with the plane of said idler pulley at a slight angle to the plane of said capstan pulley to tension the turns of cable encircling said pulleys and preclude piling of turns during use, said means including a cradle frame in which said idler pulley is mounted, a pivot rod passing through one end of said cradle frame and into said bracket, an adjusting screw supported in said bracket normal to the longitudinal axis of said cradle frame and threadedly engaging said cradle frame at its other end.

3. An optical perimeter comprising a standard; an arc; said arc including a pair of arc sections in lateral spaced relationship to each other to form a slot longitudinally of said arc; means for mounting said arc on said standard for pivotal rotation thereon; a target carrier, said target carrier including a cylindrical housing having a target opening therein and rail slots symmetrically disposed with respect to said target opening; a target mounted in said carrier and exposed in said target opening; a source of illumination disposed within said carrier and adjacent said target; means slidably mounting said carrier behind said arc with said target traversing a path defined by said slot, said means including a strip of material along said arc paralleling said slot and a rail affixed to said strip, both said strip and rail passing through said rail slots in said carrier housing; means for sliding said target carrier along said rail, said means comprising a pulley system including a capstan pulley and means for rotating the same, an idler tension pulley, means adjustably supporting said idler pulley in adjustable spaced relationship to said capstan pulley with the plane of said idler pulley at a slight angle to the plane of said capstan pulley, a pulley mounted at each end and to the rear side of said arc, and a drive cable having one end connected to said target carrier, said cable passing through an end pulley, around said idler and capstan pulleys a number of turns, then through the remaining end pulley and back to the target carrier; and means for energizing said source of illumination.

4. An optical perimeter comprising a standard; an arc, said arc including a pair of arc sections in lateral spaced relationship to each other to form a slot longitudinally of said arc; means for mounting said arc on said standard for pivotal rotation thereon, said means including a sleeve through the upper end of said standard supported in bearing means for rotational movement in said standard, and a bracket affixed to one end of said sleeve and supporting said arc; a target carrier, said target carrier including a cylindrical housing having a target opening therein and rail slots symmetrically disposed with respect to said target opening; a target mounted in said carrier and comprising a section of light conducting rod having one end terminating in said target opening; a source of illumination disposed adjacent the other end of said light conducting rod; means for selectively altering the color of light passing from said light source to said target, said means including a color wheel rotatably disposed between said source of illumination and said light conducting rod and having a plurality of color lenses of different colors, and means for manually rotating said color wheel to effect successive interposition of said lenses in the path of light from said source to said target; means slidably mounting said carrier behind said arc with said target traversing a path defined by said slot, said means including a strip of material along said arc paralleling said slot and a rail affixed to said strip, both said strip and rail passing through said rail slots in said carrier housing; guide bearings on said housing and bounding said rail slots; means for sliding said target carrier along said rail, said means comprising a pulley system including a capstan pulley affixed to one end of a shaft, bearings mounted in said sleeve and rotatable by a crank affixed to the other end thereof, an idler tension pulley, means adjustably supporting said idler pulley on said bracket in adjustable spaced relationship to said capstan pulley with the plane of said idler pulley at a slight angle to the plane of said capstan pulley, said means including a cradle frame in which said idler pulley is mounted, a pivot rod passing through one end of said cradle frame and into said bracket, an adjusting screw supported in said bracket normal to the longitudinal axis of said cradle frame and threadedly engaging said cradle frame at its other end, a pulley mounted at each end and to the rear side of said arc, and an intermediate guide pulley supported from said bracket between said idler pulley and an associated end pulley, a drive cable having one end connected to said target carrier, said cable passing through an end pulley and associated guide pulley, around said idler and capstan pulley assembly a number of turns, then through the remaining guide pulley and end pulley and back to the target carrier; a wear strip affixed to the back of said arc along the path of movement of said drive cable; and means for energizing said source of illumination, said means including an electrical contact running along the rail mounting strip, a contact brush in said carrier housing and in sliding engagement with said contact, and means connecting said source of illumination to a power source through said contact and brush.

5. An optical perimeter comprising a standard, an arc, means for mounting said arc on said standard for pivotal rotation thereon, said means including a sleeve through the upper end of said standard supported in bearing means for rotational movement in said standard, and a bracket affixed to one end of said sleeve and supporting said arc, a target carrier, a target carried by said carrier, means slidably mounting said carrier for movement along said arc, means for sliding said target carrier along said carrier-mounting means, said means comprising a pulley system including a capstan pulley mounted in a shaft through said bracket and rotated by a crank affixed to the other end thereof, and an idler tension pulley, pulley means mounted on said arc, a drive cable wrapped a number of turns around said capstan and idler pulleys and passing through said arc mounted pulley means to said carrier to form a closed loop, and means for tensioning the cable between said capstan and idler pulleys to the exclusion of the rest of said cable loop.

6. An optical perimeter comprising a standard, an arc, means for mounting said arc on said standard for pivotal rotation thereon, said means including a bracket intermediate said arc and said standard, a target carrier, means slidably mounting said carrier for movement along said arc, a capstan pulley carried by said bracket, an idler tension pulley also carried by said bracket, but in a plane making a slight angle with the plane of said capstan pulley, pulley means mounted on said arc, a drive cable wrapped a number of turns around said capstan and idler pulleys and passing through said arc mounted pulley means to said carrier to form a closed loop.

References Cited in the file of this patent

UNITED STATES PATENTS

| | | |
|---|---|---|
| 1,115,408 | De Zang | Oct. 27, 1914 |
| 1,942,850 | Tillyer | Jan. 9, 1934 |
| 2,282,494 | Potter | May 12, 1942 |
| 2,283,769 | Schwanzel | May 19, 1942 |

FOREIGN PATENTS

| | | |
|---|---|---|
| 256,760 | Great Britain | Aug. 19, 1926 |
| 650,912 | Germany | Oct. 4, 1937 |